United States Patent [19]

Mahan

[11] 4,105,091
[45] Aug. 8, 1978

[54] SAWHORSE

[76] Inventor: Philip J. C. Mahan, 60 Cherokee Hills, Tuscaloosa, Ala. 35401

[21] Appl. No.: 711,701

[22] Filed: Aug. 5, 1976

[51] Int. Cl.² ............................................. F16M 11/00
[52] U.S. Cl. .................................... 182/181; 182/151; 182/224
[58] Field of Search ............... 182/181, 182, 183, 184, 182/185, 224, 225, 151; 144/288 R, 286

[56] References Cited

U.S. PATENT DOCUMENTS

| | | | |
|---|---|---|---|
| 145,174 | 12/1873 | Harden | 182/181 |
| 2,911,265 | 11/1959 | Hannah | 182/181 |
| 2,954,977 | 10/1960 | Durlacher | 182/151 |
| 3,035,660 | 5/1962 | Leon | 182/181 |
| 3,177,974 | 4/1965 | Martin | 182/129 |
| 3,225,865 | 12/1965 | Downey | 144/288 R |

*Primary Examiner*—Reinaldo P. Machado

[57] ABSTRACT

This manufacture is a sawhorse, so designed that one will perform tasks that are difficult, if not impossible, with two traditional sawhorses.

Parallel but separated backs support wide materials for sawing, cutting, or drilling. Narrow materials are supported by the legs and contained between the backs. Kerfs in the backs are aligned to permit forty-five and ninety degree cuts when the backs are used as a miter box. The legs are constructed to hold tools used in the construction process. The sawhorse assembles and disassembles without tools, and it stores and transports flat.

1 Claim, 4 Drawing Figures

SAWHORSE

BACKGROUND OF THE INVENTION

Sawhorses as portable structures for supporting building materials have gone through little if any evolutionary change since their creation. As a result, their utility remains quite limited. Ripping a piece of lumber is virtually impossible using a single sawhourse as support, and wide pieces cannot be held firmly enough to permit cross cutting with accuracy. Even with two traditional sawhourses, some tasks, such as cutting a 12-inch piece of 2 × 4 into two 6-inch pieces or ripping a sheet of plywood, cannot be done without additional supports.

Existing sawhorses provide no way of keeping tools within reach. Saws, hammers, rules, and squares must be laid on the ground while using the horses. If a folding rule is used to measure material, it must be folded up after each measurement or some safe place must be provided for laying it down. There is no place on the sawhorse for it to rest safely. Storing or transporting traditional sawhorses is difficult because of their awkward proportions and construction.

SUMMARY

This invention provides one sawhorse, easily disassembled for storing or transporting. The new combination of dual backs and legs provides the mechanic an efficient structure with which he can perform operations not possible with two traditional horses. This sawhorse also is designed to keep saws, hammers, squares, and rules within easy reach of the mechanic.

Figure 1:
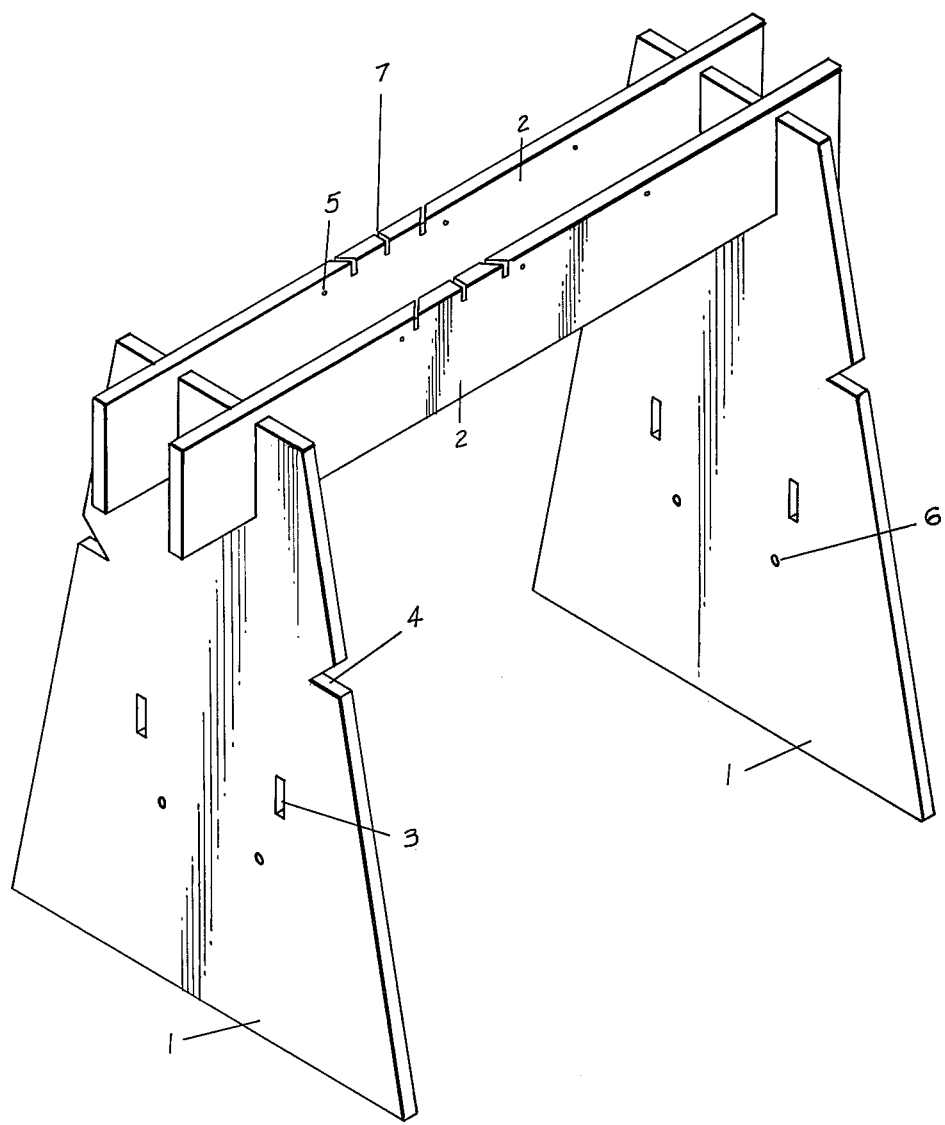
FIG. 1 is a prespective view of the sawhorse in assembled condition.
Figure 2:
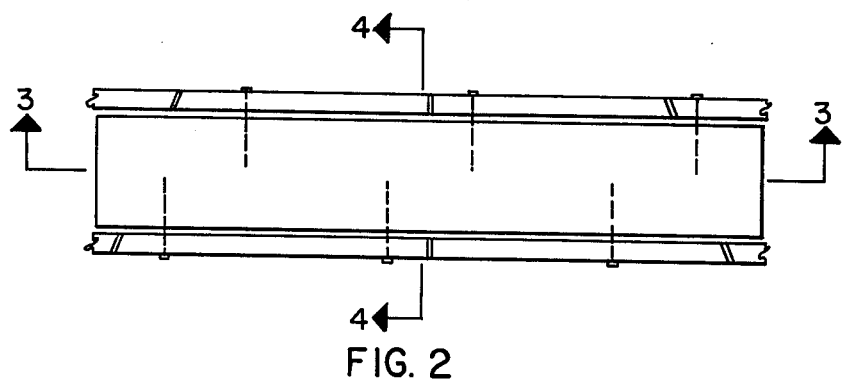
FIG. 2 is a top plan view showing parts of the sawhorse.
Figure 3:
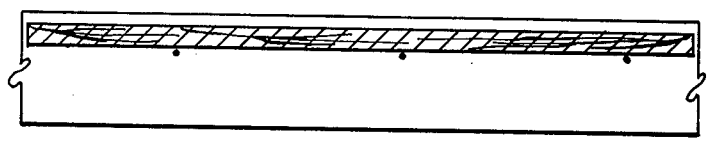
FIG. 3 is a cross-sectional view taken along the broken line 3—3 of FIG. 2.
Figure 4:
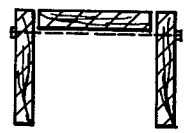
FIG. 4 is a detailed cross-sectional view taken along the broken line 4—4 of FIG. 2.

Legs 1, Backs 2, Slots for holding a square 3, Notches to hold rule or hammer 4, Holes for nails 5, Holes for dowels 6, Kerfs at forty-five and ninety degrees 7.

DESCRIPTION OF THE PREFERRED EMBODIMENTS

This sawhorse consists of two legs, notched at the top to interlock with notches in the backs. The backs are parallel and separated, and raised above the top edge of the legs. A series of holes is drilled through the sides of the backs parallel with and below the top edge of the backs. Kerfs are cut into the backs to form forty-five and ninety degree angles. The legs contain notches sufficiently deep to hold the claws of a hammer or an extended folding rule. There are slots for a square, and holes for dowels to form a rack for power saw or drill.

MODE OF OPERATION

Dual but separated backs provide a broad base for support of wide material. Narrow materials fit between the backs, supported on the top edges of the legs. The backs extend above the plane of the leg tops. Wedges can be inserted between the raised back and the material to be cut, holding the material so firmly in position that an eighth of an inch may be cut off a 1-foot piece of 2 × 4 lumber, or the piece cut into two 6-inch pieces.

A piece of lumber, resting on nails inserted through the holes in the backs, converts the backs into a miter box, utilizing the kerfs cut into the backs. Hammers and rules are conveniently held in the notches of the legs. Slots in the legs hold a square, and dowels inserted into the holes in the legs will form a rack for an electric saw or drill.

I claim:

1. A saw horse comprising two essentially vertical, trapezoidally shaped plate-type legs, connected to two parallel horizontal backs, spaced substantially apart, said connection being accomplished by opposing matched notches on said legs and backs, said notches being of sufficient depth to provide stability in the longitudinal direction of the backs and to provide a fixed dimension between the backs for the insertion of lumber and to provide a vertical space between the top surface of the back and the top edge of the legs, said backs having kerfs cut at commonly used angles in construction at the same depth as that existing between the tops of the backs and legs, and having holes cut perpendicularly to the longitudinal direction of the backs supporting removably positioned nails at a depth from the top surface of the backs generally sufficient to enclose and support lumber for mitering in the said kerfs.

* * * * *